United States Patent [19]
Radia et al.

[11] Patent Number: 6,044,224
[45] Date of Patent: Mar. 28, 2000

[54] MECHANISM FOR DYNAMICALLY ASSOCIATING A SERVICE DEPENDENT REPRESENTATION WITH OBJECTS AT RUN TIME

[75] Inventors: Sanjay R. Radia, Fremont; Swee Boon Lim; Peter B. Kessler, both of Palo Alto, all of Calif.

[73] Assignee: Sun Microsystems, Inc., Palo Alto, Calif.

[21] Appl. No.: 08/670,682

[22] Filed: Jun. 26, 1996

[51] Int. Cl.[7] .................................................. G06F 15/00
[52] U.S. Cl. ............................................ 395/710; 395/685
[58] Field of Search .................................... 395/710, 600, 395/685, 682, 200.33, 701, 200.51, 671

[56] References Cited

U.S. PATENT DOCUMENTS

| | | | |
|---|---|---|---|
| 5,437,025 | 7/1995 | Bale et al. | 707/103 |
| 5,491,800 | 2/1996 | Goldmith et al. | 395/200.51 |
| 5,515,508 | 5/1996 | Pettus et al. | 395/200.33 |
| 5,560,014 | 9/1996 | Imamura | 395/701 |
| 5,577,251 | 11/1996 | Hamilton et al. | 395/671 |
| 5,659,751 | 8/1997 | Heninger | 395/685 |
| 5,727,145 | 3/1998 | Nessett et al. | 395/186 |
| 5,778,227 | 7/1998 | Jordan | 395/682 |
| 5,787,251 | 7/1998 | Hamilton et al. | 395/200.33 |

OTHER PUBLICATIONS

IBM, "SOMobjects Developer Toolkit Users Guide", Version 2.0, Chapter 6, pp. 1–73, Jun. 1993.

*Primary Examiner*—Tod R. Swann
*Assistant Examiner*—Matthew Smithers
*Attorney, Agent, or Firm*—Beyer & Weaver, LLP

[57] ABSTRACT

A data structure for dynamically associating a service dependent representation with a servant object at run time is used in a distributed object computing system that incorporates subcontracts. Subcontracts supply different functionalities to objects. The data structure exists before run time, and is used at run time to perform the dynamic association. An arrangement also exists at run time. The structure comprises a service representation class representing a single subcontract, a servant base class associated with servant objects created at run time, and a linking mechanism to form a run time link between the server rep class and a servant object at run time. The server rep class provides functionality unique to a subcontract. At run time, servant objects are instantiated from the servant base class or a more derived class. The servant object uses the functionality provided by a subcontract by way of the linking mechanism. An arrangement exists at run time for dynamically linking a servant object to a subcontract. Included are a servant object, a server rep object, and a pointer from the servant object to the server rep object. Methods and apparatus allow a servant object itself to initiate calls to deactivate itself, to determine remaining references to itself, to revoke itself, and to get an object reference for itself. A method creates a servant object that includes the above data structures and ability to call these functions.

25 Claims, 11 Drawing Sheets

MECHANISM FOR DYNAMICALLY ASSOCIATING A SERVICE DEPENDENT REPRESENTATION WITH OBJECTS AT RUN TIME

CROSS REFERENCE TO RELATED APPLICATIONS

U.S. patent application "Method and Apparatus for Subcontracts in Distributed Processing Systems", Ser. No. 08/554,794 filed Nov. 7, 1995, a continuation of Ser. No. 07/995,863, filed Dec. 21, 1992, now abandoned, is related to the present application and is incorporated by reference herein in its entirety. Additionally, the following U.S. patent applications, all filed concurrently herewith, are related to the present application and are incorporated by reference herein in their entirety: Ser. No. 08/670,684; Ser. No. 08/673,181; Ser. No. 08/670,681; Ser. No. 08/670,700; and Ser. No. 08/669,782.

FIELD OF THE INVENTION

The present invention relates generally to the management of objects within a distributed object system of a computer network. More specifically, the present invention relates to associating services provided by the distributed object system with an object at run time.

BACKGROUND OF THE INVENTION

With the increasing popularity of object-oriented programming languages and systems, the development of distributed object systems has presented new challenges regarding the creation and management in general of the objects within these distributed systems. In particular, functions that control the life cycle of objects such as creation, activation, destruction, etc., may be implemented according to particular semantics dictating a particular protocol, or method of implementation. However, rather than there being a single set of obvious semantics for all objects, there appears to be a wide range of possible object semantics, often reflecting different application requirements. For example, there are distributed object systems that include integrated support for features such as replication, atomic transactions, object migration, and persistence. But there are also distributed object systems that provide only minimal features and instead concentrate on high performance.

One possible reaction to this diversity is to attempt to invent a single distributed object system for objects that includes all possible features. Unfortunately, the list of possible features is continually expanding, and not all features are necessarily compatible. For example, a high performance system may not want its objects to include support for the features of persistence or atomicity. Moreover, there are often a variety of different ways of implementing a given set of semantics. Having a single system prevents applications from exploiting new and improved features that may better reflect their real needs. For example, in order to increase reliability, it may be desired to support the feature of object replication. However, it would not be desirable to have client application code doing extra work simply to talk to replicated objects, so it would be preferable to support replication "underneath the covers", as part of the object's invocation mechanism. But there are many different ways of implementing replication, and it is undesirable to build in support for some particular set of features while implicitly rejecting others.

There are a wide variety of features or object mechanisms that a distributed object system might provide. By way of example, a distributed object system may provide such features such as replication, atomic transactions, object migration, persistence, naming, event notification, relationships, server activation, clean shutdowns, transactions, security, and enablement of filters (compression, encryption, tracing, debugging, etc.). These features may also be called services and may be provided by an Object Services module as part of a distributed object system. Past distributed object systems have suffered in that they were unable to provide a flexible subset of these features for different applications, much less for different objects within an application. Past systems only provided a fixed set of these features.

This deficiency may be addressed through the notion of a subcontract. Subcontracts and their use are described in above-referenced patent application Ser. No. 08/554,794. The notion of a subcontract is also described in "Subcontract: A Flexible Base for Distributed Programming" by G. Hamilton, M. Powell and J. Mitchell, published by Sun Microsystems Laboratories, Inc., 1993. Subcontracts and their associated functionality may be implemented in many different ways. By way of example, one such implementation is herein described.

Through the use of subcontracts, an application may specify which of the various above features (among others) it wishes to take advantage of, or may even specify different groups of features that may be used by different objects within the application. A group or a permutation of these features is implemented by a subcontract. Thus, each object within an application may utilize a particular subcontract. A group of desired features may be represented by a quality of service list that specifies these features. A subcontract, then, provides functionality consistent with a particular quality of service within a distributed object application and may provide other functionalities associated with that subcontract. An object may have one subcontract associated with it at a given time. Subcontracts are separate from object interfaces and object implementations. Thus, it is easy for object implementers to either select and use an existing subcontract, or to implement a new subcontract. Correspondingly, application level programmers need not be aware of the specific subcontracts that are being used for particular objects. A subcontract associated with an object allows the business of implementing an object to be separate from the business of implementing the object mechanisms or features provided by the system. Subcontracts also enable certain of the object invocation functions to be decoupled from a transport layer of a system, thus allowing the transport layer to function with different systems.

The availability of subcontracts enable object implementers to choose from a range of different object mechanisms (or features) without requiring that every object implementer must become familiar with the details of the object implementation machinery. The set of features that subcontracts provide are the right levers for obtaining control within a distributed environment. By design, all of the key actions taken on remote objects will involve the object's subcontract in one way or another. By way of example, actions such as object creation, object reference creation, object deactivation and revocation, and determining the references to an object all involve the object's subcontract. Subcontracts provide an effective way for plugging in different policies for different objects and are successful in reducing the functionality that must be provided by the base system.

However, one drawback with some distributed object systems is that servant objects themselves have been unable to call these actions directly. For example, servants were unable to call the functions "deactivate", "revoke", "expect no remaining references" or "get object reference" upon themselves. This deficiency reduced the flexibility of these systems. And another important drawback of certain distributed object systems is that the mechanism by which a particular subcontract was associated with a particular object has not been flexible enough. That is, these mechanisms have been able to associate a particular subcontract with an object definition or an object class, but have not been able to associate a subcontract with an instance of a class, or the object itself. This deficiency may be better explained by reference to FIG. 2.

FIG. 2 illustrates an example of how one particular distributed object application might be implemented. In this application the developer has defined an object type by way of an interface definition 122. This interface definition may be implemented by way of an Interface Definition Language (IDL) as will be appreciated by those skilled in the art. An interface specifies the operations and attributes available for an object type. For example, the interface COUNTER 122 specifies an object type that includes one operation "increment" and one attribute "maximum". If the developer wishes to create objects (also called instances or servants) of this object type that utilize the services of a particular subcontract X, he or she must specify this subcontract X in the class definition for that object type. As shown here, the developer has specified subcontract X for servant class A 124. Thus, the two servants created at run time, servant A1 128 and servant A2 130, will have the functionality associated with subcontract X by virtue of their being instantiated from servant class A. The drawback is that this subcontract X must be specified during application development before compile time of the servant class A.

For example, if the developer also wishes to create servants of the same object type that implement a different subcontract Y, the developer must create a whole new servant class because only one subcontract may be specified for a given servant class. As shown here, the developer has created a separate servant class B 126 which also implements the interface COUNTER. Servant class B is identical to servant class A except that servant class B specifies subcontract Y instead of subcontract X. In this fashion, a servant B1 132 may now be instantiated at run time with the functionality associated with subcontract Y. The problem is that if a developer wishes multiple servants of a given interface to utilize different subcontracts, he or she must write or specify a different servant class for each subcontract desired. This excess coding is time consuming and wasteful. Furthermore, the system is less flexible because subcontracts may only be associated with servants at compile time and not at run time. And some systems are even less flexible. Some systems require that a subcontract be specified in the object's interface, thus requiring needless duplication in order to have one interface for each type of subcontract desired for servant objects.

Accordingly, it would be desirable to have a mechanism for dynamically associating a subcontract with an individual servant (an object instance) at run time instead of with a servant class or interface at compile time. Such a mechanism would also be compatible with various of the object life cycle functions.

SUMMARY OF THE INVENTION

One embodiment of the present invention relates to an association mechanism data structure for dynamically associating a service dependent representation with a servant object at run time. This association mechanism data structure exists before run time, and may be used at run time to perform the dynamic association. This data structure is used in a distributed object computing system that incorporates different subcontracts. The association mechanism data structure is embodied in a computer-readable medium and comprises at least one server rep class representing a single one of the plurality of subcontracts. This server rep class is arranged to provide functionality unique to a single one of the plurality of subcontracts. Also included is at least one servant base class arranged to be associated with servant objects that are created at run time. That is, at run time, servant objects will be instantiated from the servant base class or a more derived class. In addition, a linking mechanism is arranged to form a run time link between the server rep class and a selected one of said servant objects at run time such that the servant object may use the functionality provided by said single one of the plurality of subcontracts. In one embodiment, a server rep object instantiated from the server rep class is used to form the link.

In another embodiment of the invention, an arrangement exists at run time for dynamically linking a servant object to functionality provided by a subcontract. This run-time arrangement is embodied in a computer-readable medium for use in a distributed object computing system that incorporates a plurality of subcontracts. The run-time arrangement includes a servant object that takes the form of an instance of a distributed object. Also included is a server rep object representing a single one of the plurality of subcontracts. The server rep object is arranged to provide functionality unique to a single one of the plurality of subcontracts by way of a server rep class. Also, the server rep object is associated with the servant object. Additionally included is a link between the server rep object and the servant object that permits the servant object to access the functionalities provided by the server rep object. In one embodiment, this link takes the form of a location indicator from the servant object to the server rep object.

Other embodiments relate to methods and apparatus that make use of the above data structures. One aspect is a method of creating a distributed servant object for use in a distributed object computing system that provides a plurality of subcontracts for use in managing distributed objects. The method includes various steps. One step involves receiving a servant class name and an object adaptor delegate identifying a single one of the plurality of subcontracts. In another step, a servant object corresponding to the received servant class name is instantiated. Next, a create method of the object adaptor delegate is called in order to produce a server rep object. This server rep object is arranged to provide functionality unique to a single one of the plurality of subcontracts identified by said object adaptor delegate. Finally, the produced server rep object is associated with the servant object. Thus, the servant object may use the functionality provided by a single one of the plurality of subcontracts available through the server rep object.

Another aspect is a method for revoking a distributed servant object in a distributed object computing system that provides a plurality of subcontracts for use in managing distributed objects. First, a servant revoke method associated with the servant object is called. The servant revoke method is called by the servant object. Next, a server rep revoke method associated with the server rep object is called. The server rep object is arranged to provide functionality unique to a single one of the plurality of subcontracts. And finally, the servant object is revoked by way of the called server rep revoke method.

Another aspect is a method for creating an object reference of a servant object for use by a client in a distributed object computing system that provides a plurality of subcontracts for use in managing distributed objects. First, a get object reference request for a specified super class of a servant object is received. The request originates from the servant object. Next, a server rep object associated with the servant object is identified. The server rep object is arranged to provide functionality unique to a single one of the plurality of subcontracts. In another step, a get object reference method associated with the server rep object is called. Also, a fat pointer to the servant object is created. The fat pointer is created by the get object reference method. And finally, widening the fat pointer in order to associate it with the specified super class.

Another aspect is a method for deactivating a distributed servant object in a distributed object computing system that provides a plurality of subcontracts for use in managing distributed objects. First, a servant deactivate method associated with the servant object is called. The servant deactivate method is called by the servant object. Next, a server rep deactivate method associated with the server rep object is called. The server rep object is arranged to provide functionality unique to a single one of the plurality of subcontracts. Finally, deactivating the servant object by way of the called server rep deactivate method.

BRIEF DESCRIPTION OF THE DRAWINGS

The invention, together with further advantages thereof, may best be understood by reference to the following description taken in conjunction with the accompanying drawings in which:

FIG. 1b shows the flow of a request from a client to a servant object within the distributed object system of FIG. 1a.

DETAILED DESCRIPTION OF THE INVENTION

OVERVIEW

Figure 1A:
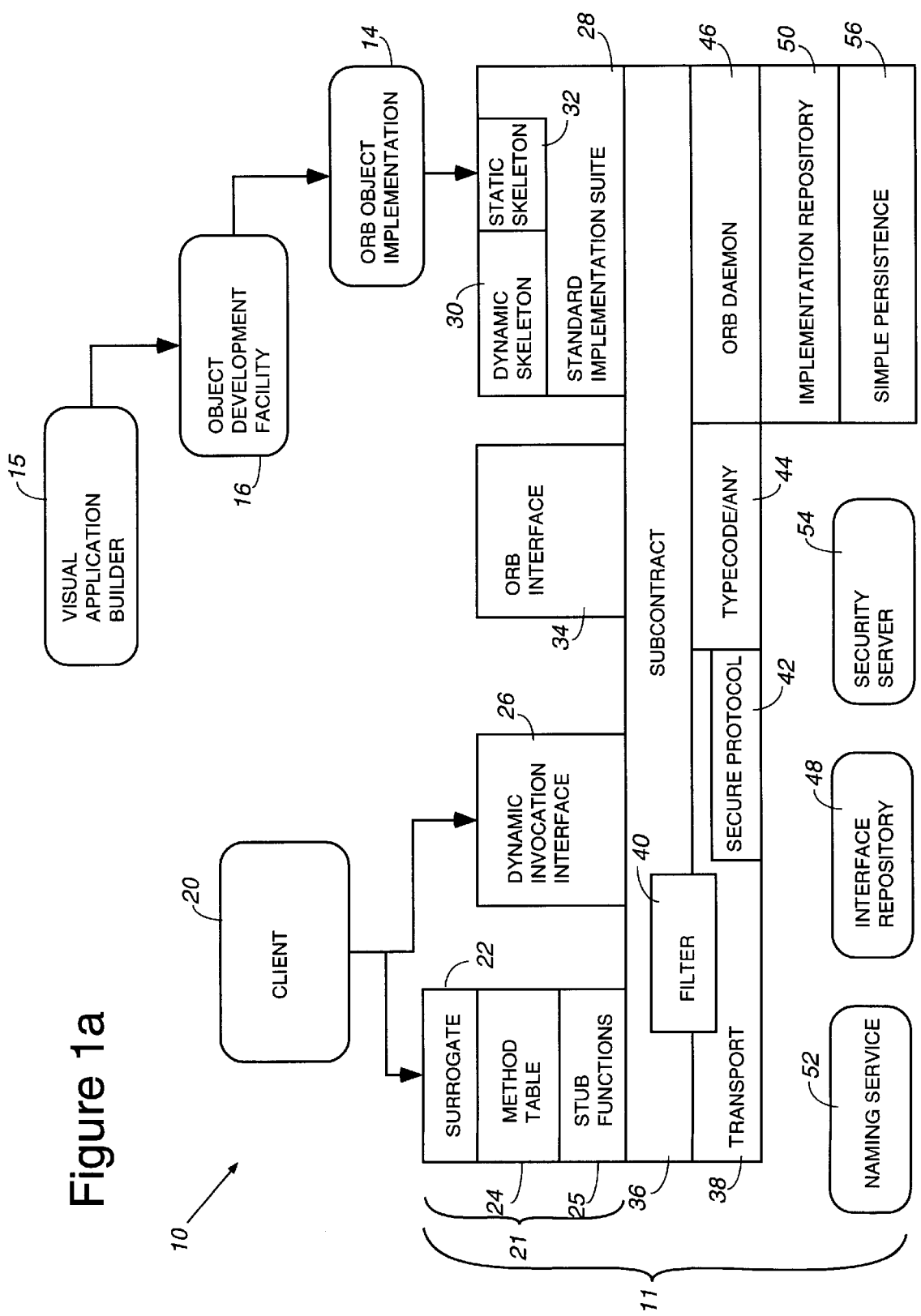
FIG. 1a illustrates a distributed object system having an object request broker (ORB) portion, object development facilities and client and server objects according to one embodiment of the present invention.
Figure 1B:
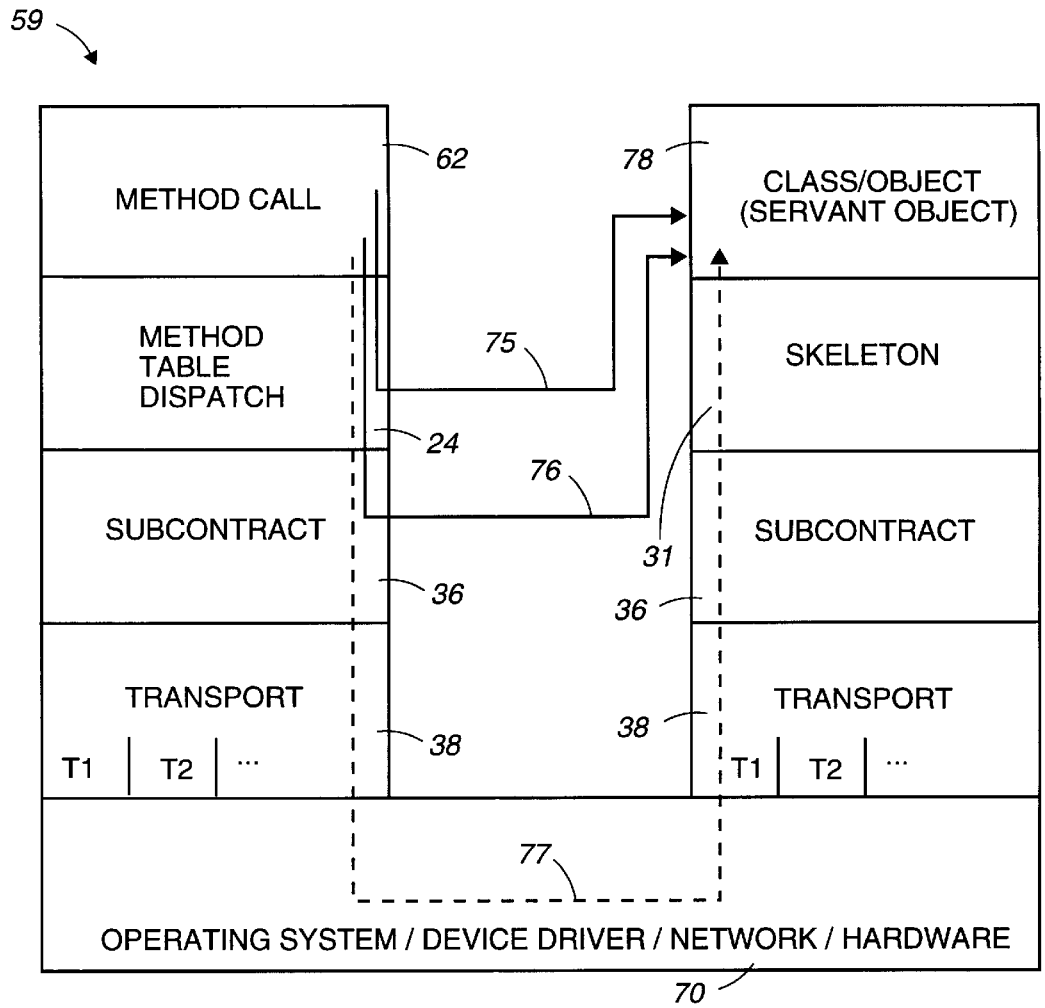
Figure 1C:
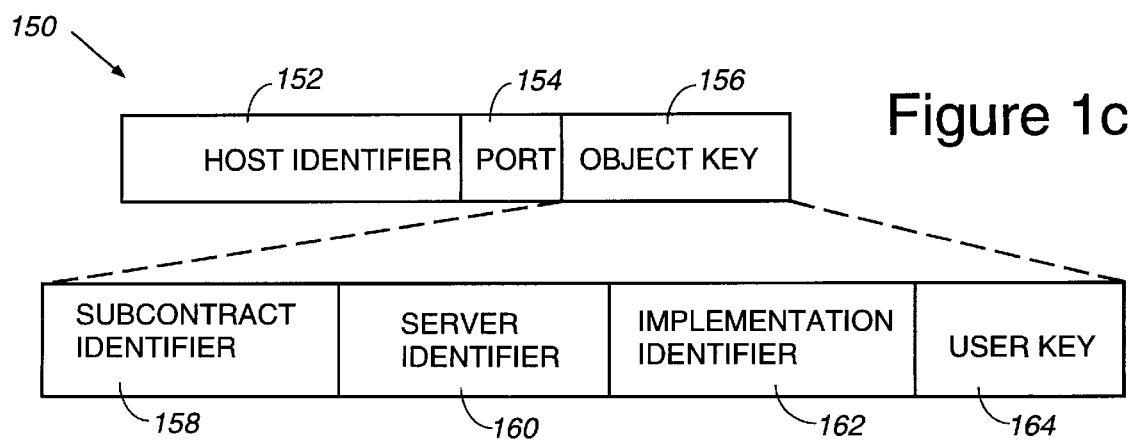
FIG. 1c is an embodiment of an object reference suitable for use within the distributed object system of FIGS. 1a and 1b.
Figure 2:
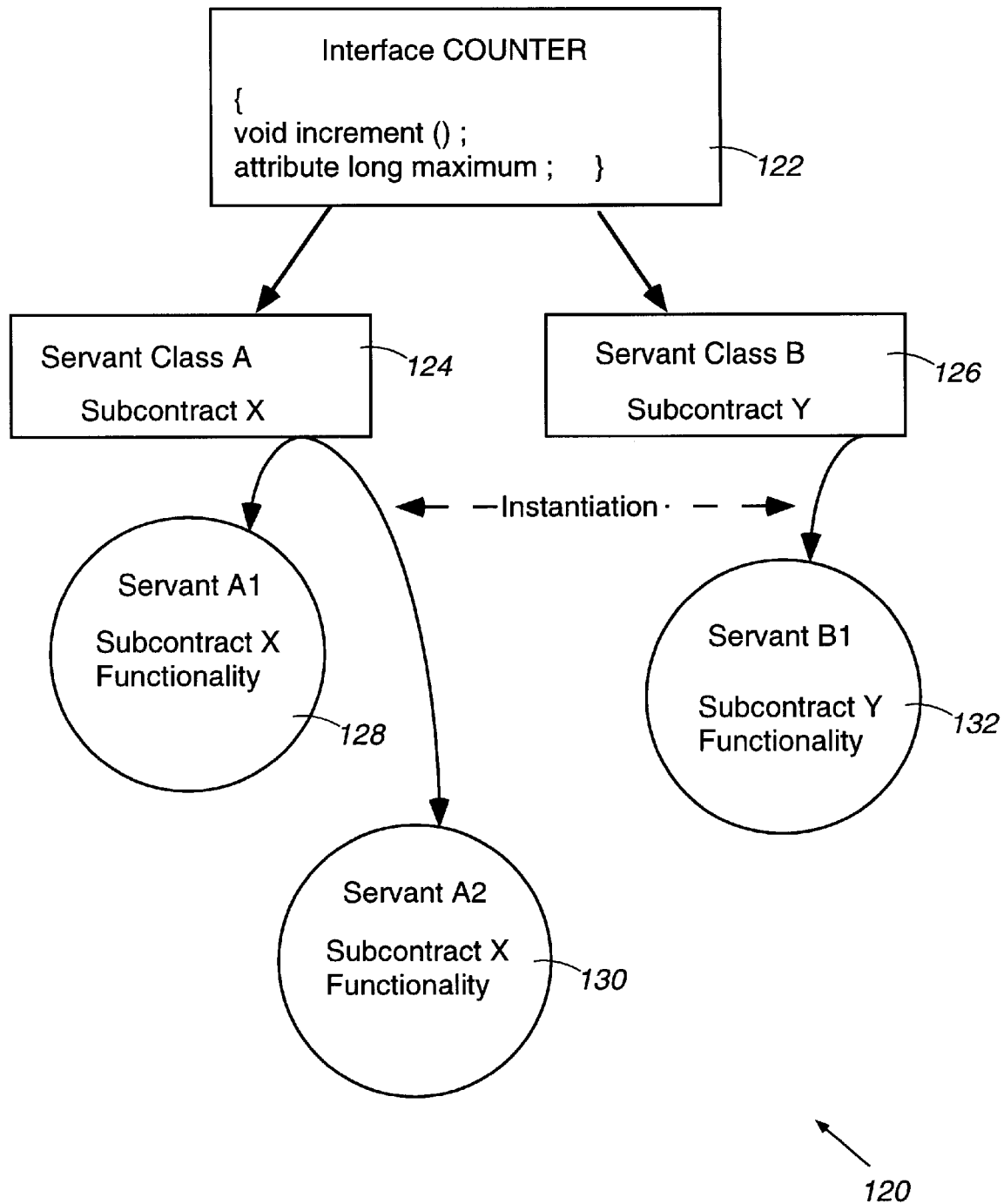
FIG. 2 shows a subcontract association mechanism of one example of a distributed object system.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, an embodiment of the present invention will be described primarily within the context of an Object Request Broker (ORB) implemented under the CORBA specification from the Object Management Group (OMG), Revision 2.0, dated July 1995, which is incorporated herein by reference. FIG. 1a diagrammatically illustrates the overall architecture of a representative distributed object system suitable for implementing an embodiment of the present invention. FIG. 1b diagrammatically illustrates some possible flow paths that a request from a client to a servant object may follow within such an architecture that includes a three-level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 11 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DIE) 26 instead of through surrogate 22, method table 24 and stub functions 25. Dynamic invocation interface 26 is used to enable clients to construct dynamic requests. One procedure by which a client may make a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is the subject of the present invention described below.

Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client Mechanisms for marshaling and unmarshaling inter-object communications are described in above-referenced U.S. patent application Ser. No. 08/673,181 (Attorney Docket No. SUN1P082). A technique for marshaling/unmarshaling an object reference is described in above-referenced U.S. patent application Ser. No. 08/670,681 (Attorney Docket No. SUN1P085).

A standard implementation suite 28 (or object adapter) represents a set of subcontracts that interact with ORB objects 14 in identical ways, as for example object key management. One such implementation suite is described in above-referenced U.S. patent application Ser. No. 08/669,782 (Attorney Docket No. SUN1P077). It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object 78 (as will be explained in more detail below with reference to FIG. 1b). Thus, skeletons 30 and 32 call an appropriate servant object 78. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface.

As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer points to a client representation ("client rep") associated with the referenced object. A second pointer points to a method table of the method table dispatch 24 that is associated with the referenced object. A client representation is an object that has methods that support invocation as well as CORBA defined "pseudo" object reference operations. These operations include, but are not limited to, a "duplicate" method, a "release" method, a "narrow" method, a "hash" method, and an "is equivalent" method.

After the client has initiated a call, the call is processed using a method table dispatch mechanism 24. Such a technique is disclosed in U.S. patent application Ser. No. 08/307,929 and is hereby incorporated by reference.

The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate one of the stub functions 25 to process the method call, and then pairs the method call with the appropriate stub function. In the event that the client making the method call is in the same process as the servant object, a local stub function is called. The local stub function sends the method call directly to servant object 78. A technique for routing calls within a local process is described in above-referenced U.S. patent application Ser. No. 08/670,684 (Attorney Docket No. SUN1P078). Alternatively, if the servant object is in a different process, i.e. a remote process, a remote stub function is called. The remote stub function invokes the client representation, that delivers the invocation to servant object 78.

Subcontracts implemented by subcontract layer 36 are logic modules that provide control of the basic mechanisms of object invocation and argument passing that are important in distributed object systems. A subcontract implemented by subcontract layer 36 determines a specific quality of service for use by an object. A subcontract is uniquely identified by a subcontract identifier that is typically embedded in an object reference. A quality of service is a set of service properties. Among possible service properties that are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., that is a part of the transport layer 38 is used to marshal and physically transport information to and from servant objects. Information, i.e. the object reference or the request, is converted into protocols appropriate to a given domain. By way of example, protocols may include, but are not limited to, Ethernet protocols and general inter-ORB protocols (GIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system.

While transport mechanisms require a conversion of information into a protocol appropriate to a given domain, some transport mechanisms do not require the encoding of information for different domains. One transport mechanism that does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol that may be used by a different machine by virtue of the fact that information is remaining on the same host and therefore does not require a change of domain. Hence, information may simply be "flattened out," or marshaled into a stream that is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point that is a part of transport layer 38. In the event that an end point is not created by transport layer 38, transport layer 38 provides the functionality needed for the end point to be created by subcontract layer 36. By way of example, a dedicated end point is typically created by subcontract layer 36, while cluster end points, which typically include network and TCP/IP end points, are typically created by transport layer 38. Regardless of whether end points are created by subcontract layer 36 or transport layer 38, end points "live in," i.e. are a part of, transport layer 38. End points are essentially ports that receive information from a different domain. After an end point in transport layer 38 receives information transported from a different domain, the end point then dispatches the information from transport layer 38 to subcontract layer 36. Subcontract layer 36 then dispatches the information to the skeleton and the servant. Such a technique for performing this three-level dispatch is described in above-referenced U.S. patent application Ser. No. 08/670,700 (Attorney Docket No. SUN1P083).

Subcontract layer 36 provides the functionality to unmarshal at least some of the information it has received. That is, subcontract layer 36 unmarshals at least part of the request. Then, the request is dispatched to a skeleton 31 that transforms the request into an implementation specific format required by servant object 78. The skeleton 31 may either be a static skeleton 32 or a dynamic skeleton 30 as described above.

In general, a remote request is routed through the client side and the server side as described above. The method call 62 is received, method table dispatch layer 24 is used to identify an appropriate subcontract prior to the selection of a transport mechanism in transport layer 38 that marshals the request and prepares it for transport to another domain. Through hardware 70, the marshaled request is transported to the server side where it is received on an end point that is a part of transport layer 38. An appropriate end point receives information transported across a wire, and information is dispatched from transport layer 38 to subcontract layer 36, that provides the functionality to at least partially unmarshal the information it has received. The subcontract layer then dispatches the request to skeleton 31 that transforms the request into a specific format required by servant object 78. This path is shown by arrow 77, and is the path that may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation path, or flow path of a request for service. If a local process may be identified when an object reference is created, shortened flow paths, i.e. the paths represented by arrows 75 and 76, may be taken to send a request from a client to a server that are on the same host. The path represented by arrow 76 is more likely to be taken, as it uses subcontract layer 36 to identify an appropriate subcontract However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system that utilizes a low overhead implementation suite is illustrated in FIG. 1c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer that is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

DESCRIPTION OF THE PREFERRED EMBODIMENTS

Figure 3:
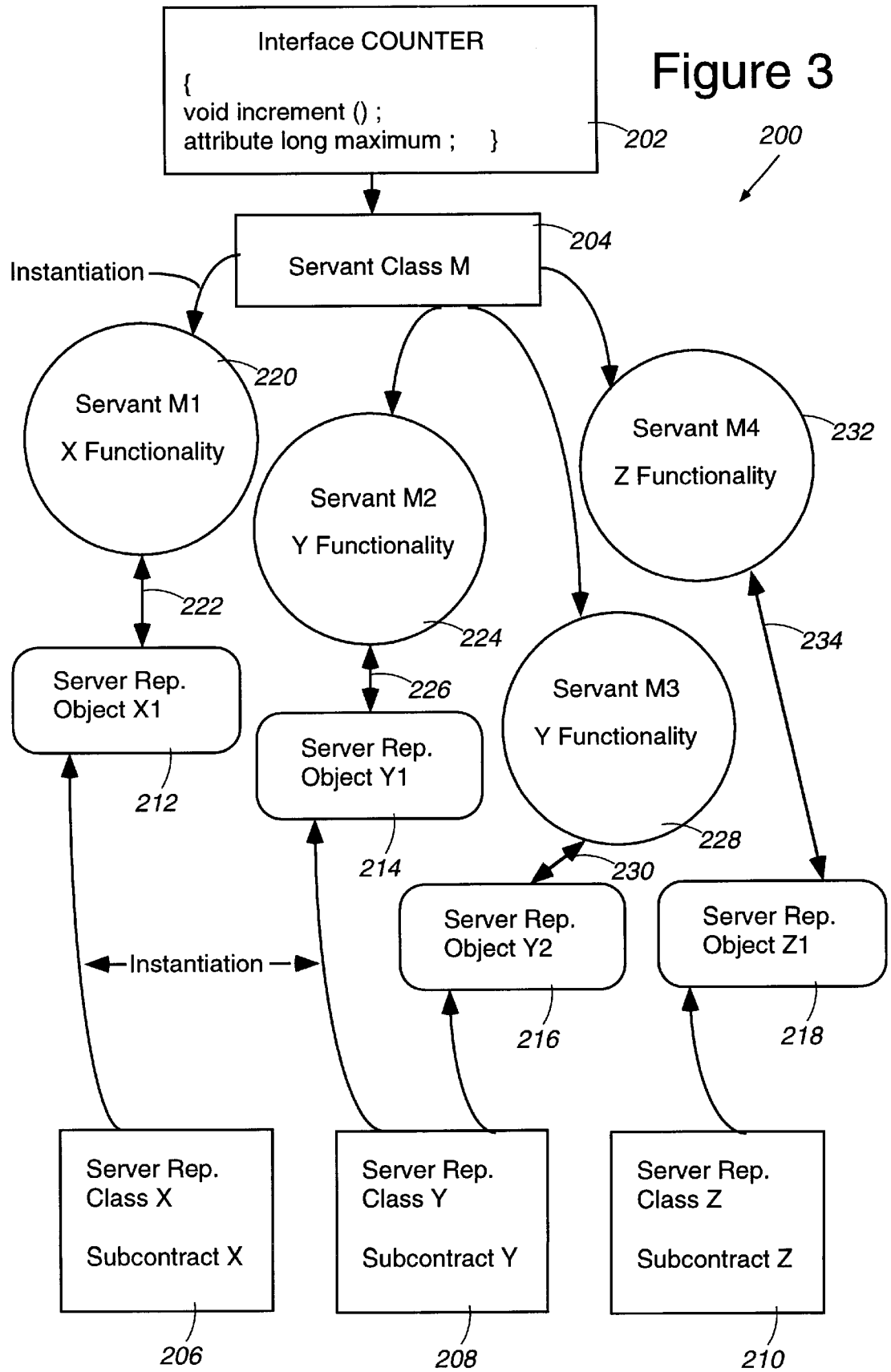
FIG. 3 shows a dynamic subcontract association mechanism in accordance with one embodiment of the present invention.
Figure 4:
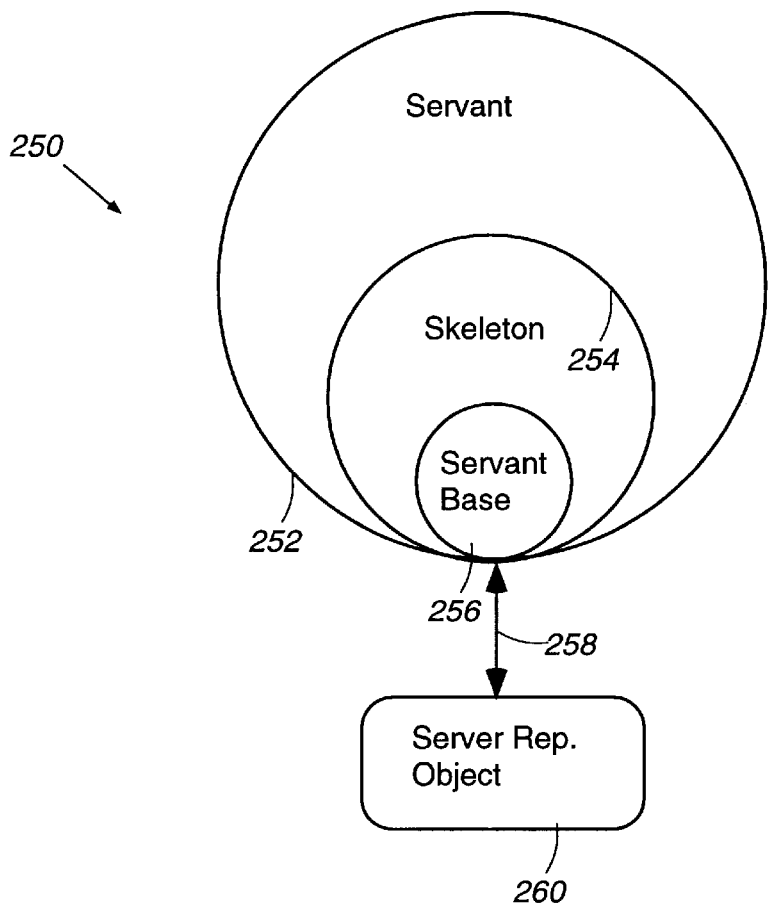
FIG. 4 shows in detail the dynamic subcontract association mechanism and in particular a link between a servant object and a server rep object.
Figure 5:
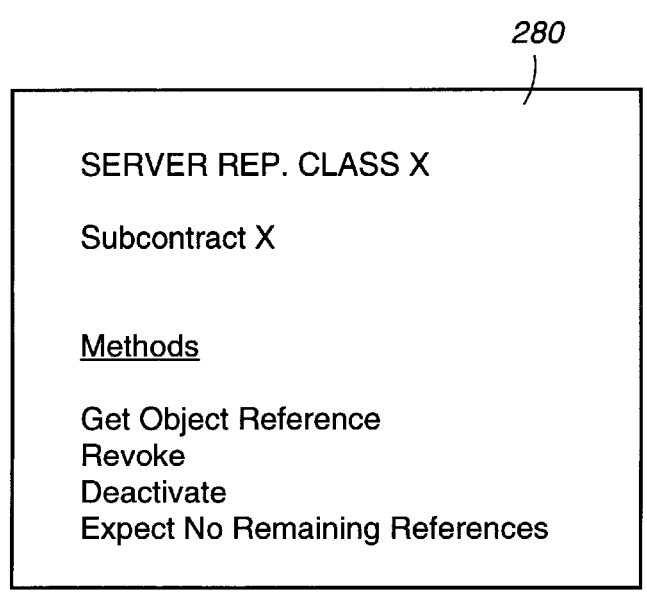
FIG. 5 is a server rep class associated with a particular subcontract and having various methods defined upon it.

An embodiment of the present invention provides a mechanism for dynamically associating a particular subcontract with a servant at run time. That is, a service dependent representation may be dynamically associated with the servant. This service dependent representation (termed a "server rep" provides a particular subcontract for use by the servant. An embodiment of this mechanism is illustrated in FIGS. 3, 4 and 5 and is explained below. The functionality of this server rep also allows a servant to itself call certain functions such as "revoke", as will be explained below with reference to FIGS. 6, 7, 8 and 9. Additionally, the present invention relates to functions associated with the life cycle of objects within a distributed object system and these functions are described below with reference to FIGS. 6 through 12.

Turning now to FIG. 3, one embodiment of a mechanism 200 for dynamically associating a subcontract with a servant will now be described. A definition of a particular object and its functionality is shown as an interface COUNTER 202. An object may be defined in a wide variety of manners. By way of example, COUNTER 202 is defined in an interface using the Interface Definition Language (IDL). COUNTER 202 is a simple definition defining an operation "increment" and one attribute "maximum". It should be appreciated that much more complex definitions are possible in which there are numerous operations, attributes, exceptions, and in which an inheritance scheme may be used. COUNTER 202 may be partially implemented by a servant class M that provides an implementation for operations and other functionality. As shown, servant class M has instantiated a servant M1 220, a servant M2 224, a servant M3 228 and a servant M4 232, each associated with a different subcontract as described below.

For a developer who wishes to associate a particular quality of service (as implemented by a particular subcontract) with individual servants, a server representation (termed a "server rep") may be utilized. Simply put, a server rep incorporates the functionality associated with a particular subcontract and is linked to a servant. In this fashion, each servant may utilize the functionality of a particular subcontract through the link to the server rep. Although it is preferable to associate only one server rep with a servant, it is contemplated that a given servant may be associated with any number of server reps. And although a server rep may be implemented in many forms, it is preferable to implement server reps as classes and objects as described below.

The lower portion of FIG. 3 shows three server rep classes, server rep class X 206, server rep class Y 208 and server rep class Z 210. With each server rep class there is associated one subcontract, respectively subcontracts X, Y and Z. In other words, each subcontract within a distributed object system will be represented by a server rep class. For example, server rep class X implements the functionality associated with subcontract X. Because there may be many servants at run time that desire to utilize the subcontract X functionality, each server rep class will instantiate a server rep object corresponding to that class for each servant. As shown, server rep class X has instantiated a server rep object 212 that is linked to servant M1. Server rep class Y has instantiated two server rep objects Y1 214 and Y2 216 linked respectively to servants M2 and M3. And server rep class Z has a server rep object Z1 218 linked to servant M4. These server rep objects are linked respectively to their servants by links 222, 226, 230 and 234. Thus, servant M4 obtains a subcontract Z functionality by way of its link to server rep object Z1 which is an instance of server rep class Z. Also, these links may be formed at run time as will be explained below with reference to FIG. 10.

Figure 10:
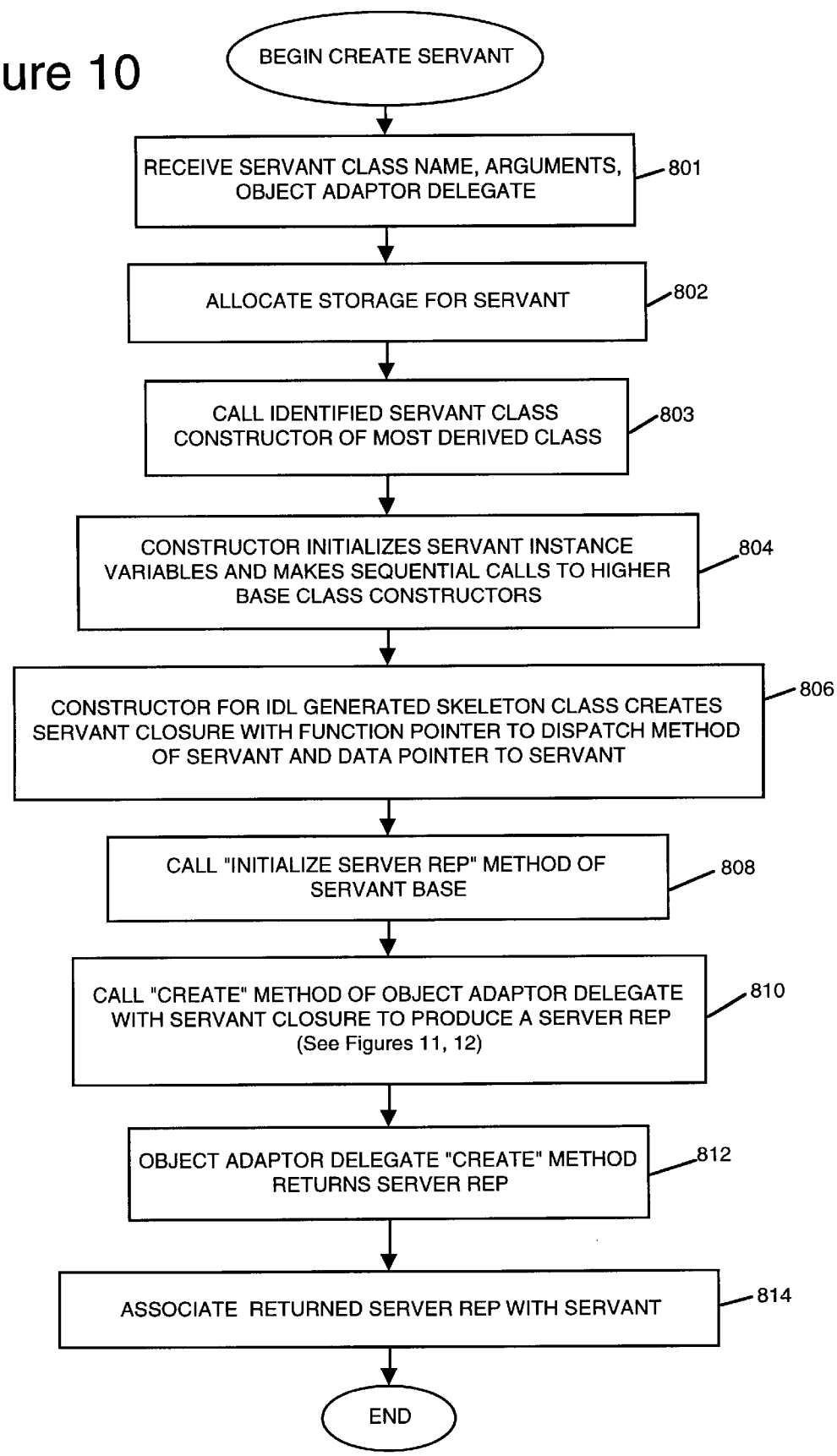
FIG. 10 is a flow chart for a "create" servant function in accordance with one embodiment of the present invention.

FIGS. 4 and 5 illustrate in more detail a servant object, the link between a servant and a server rep object, and a server rep class in accordance with one embodiment of the invention. FIG. 4 shows an example 250 of a servant linked at run time to a server rep object. Each servant inherits functionality from a skeleton 254, which in turn, inherits functionality from a servant base 256. The link 258 between the servant 252 and the server rep object 260 may be formed using any suitable method. Preferably, link 258 takes the form of a location indicator from the servant to the server rep object. This location indicator may be in the servant, or may be part of the servant base class, from which the servant inherits. The servant base class may include methods that implement the functions of "deactivation", "revocation", and "expect no remaining references" among others. In this fashion, an individual servant may call one of these methods, which in turn may call a corresponding method of the server rep class by way of the link 258. As shown in FIG. 5, each server rep class may have defined upon it methods such as "get object references", "revoke", "deactivate", and "expect no remaining references", among others. Additionally, the server rep class 280 of FIG. 5 specifies that it represents subcontract X. In this way, a unique set of methods for subcontract X may be specified and utilized by a servant. FIG. 10 below describes how a server rep object is created and linked to a servant.

FIGS. 6 through 12 describe various functions available within a distributed object system that utilize a subcontract associated with a servant. Some of these functions concern aspects of the life cycle of a servant object. The life cycle of an object may include the phases of creation, activation, deactivation, revocation and destruction. In creation, an object reference is created for a future servant, storage for the object's state is allocated and initialized, and optionally the object is registered with the naming service. In activation, a servant is created to represent the object and the servant object's state is loaded into memory. In other words, the object may be taken from secondary storage and placed into a process. In deactivation, the servant may be freed. The object may no longer be accessible, but it still exists. Revocation means that an object may not be referred to and may not be called, although it still may exist. Destruction will undo the creation activities. Also related are the functions of "expect no remaining references" and "get object reference". These functions will be discussed below.

Figure 6:
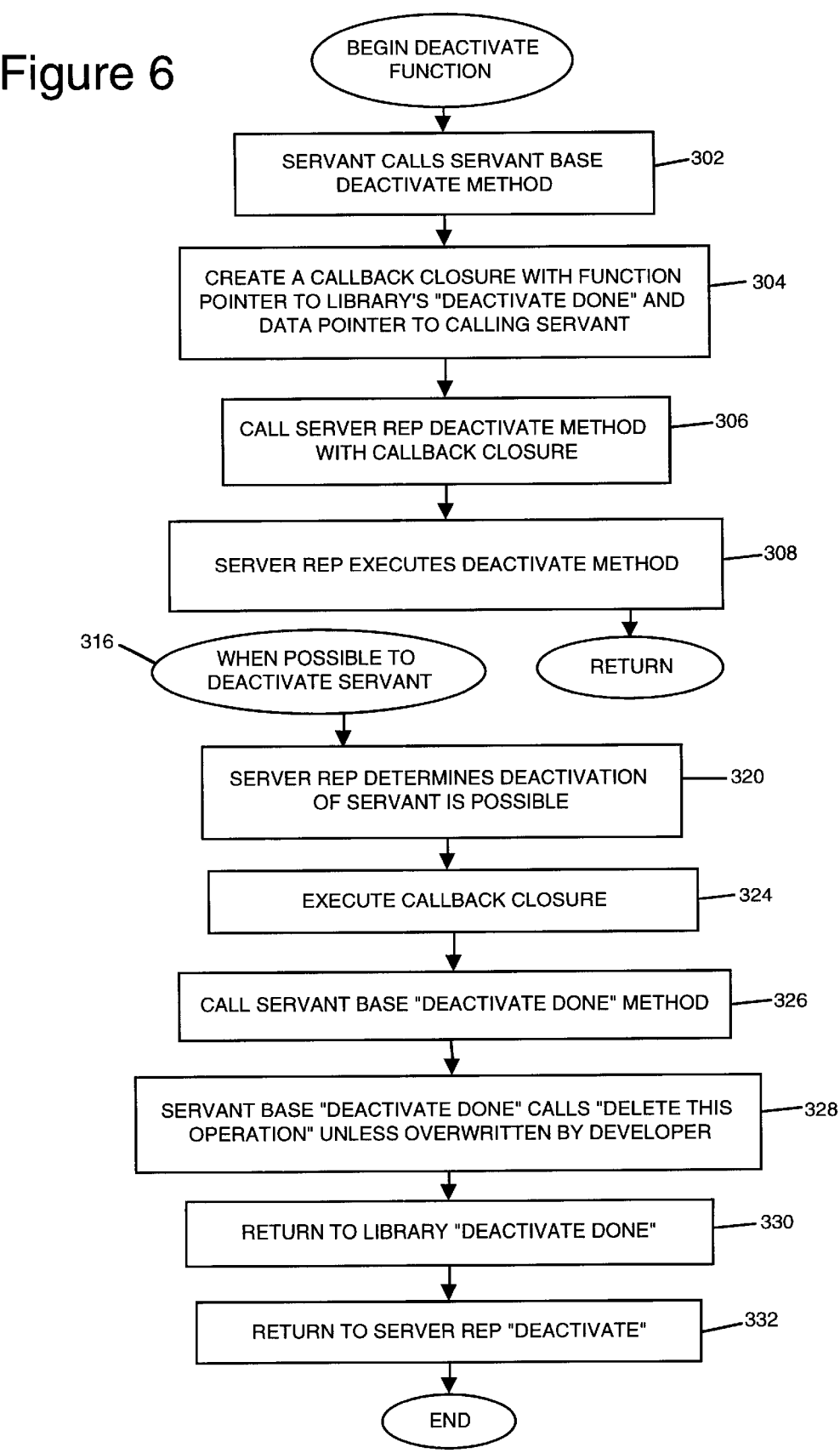
FIG. 6 is a flow chart for a "deactivate servant" function in accordance with one embodiment of the present invention.

Referring next to FIG. 6, a deactivate function in accordance with one embodiment of the invention that may be used by a servant in order to deactivate itself will be described In a first step 302, the servant calls the deactivate method defined upon the servant base class. This method is accessible to the servant because the servant base class is inherited by every servant class. Next, in step 304 this method creates a call back closure. A closure has two parts. The first part is a pointer to a function that will be executed at a later time, and the second part is a pointer to data that will be used by that function. In this case, the function pointer of the call back closure points to a "deactivate done" function in a system library, and the data pointer points to the calling servant. In step 306 the deactivate method of the associated server rep is called with the call back closure as an argument. The servant has access to this method by way of the link 258 from the servant to the server rep object as shown in FIG. 4. In step 308 this deactivate method of the server rep is executed and the call back closure is stored for later use. Next, the method returns to the servant base deactivate method which also returns from whence it was called.

At this point, the servant has been set up for deactivation, yet deactivation may not occur until the servant is ready. The servant may not be ready for deactivation due to numerous reasons. By way of example, if other objects within the distributed object system still hold references to the servant, or if they are requesting information of the servant, the servant may not be ready for activation. Thus, step 316 indicates a wait state or period in which processing within the system continues until it is determined in step 320 that deactivation of the servant is possible. Once deactivation is possible, step 324 executes the call back closure created above in step 304 by calling the function pointed to by the closure. In this case it is the library's "deactivate done" function with the servant as an argument. From within this function, the "deactivate done" method of the servant base is called in step 326. In this step 326, the most derived version of the "deactivate done" method is called, and thus allows developers a "hook" in order to overwrite the servant base "deactivate done" if desired. Specifically, by substituting a customized more derived "deactivate done" method, the developer can call a custom deactivate routine and insert custom code. Thus, the provision of the "hook" provides a very high degree of flexibility.

Assuming that "deactivate done" is not overwritten, then this method will call a delete function in step 328 to destruct and to delete the servant object. A wide variety of delete functions may be used in different languages to perform this delete function. By way of example, in the C++ programming language, the "delete this operation" function may be called. Once step 328 has finished, control returns to the library "deactivate done" in step 330, and from there control returns to the server rep "deactivate" method in step 332. After this step, the deactivate function ends.

Figure 7:
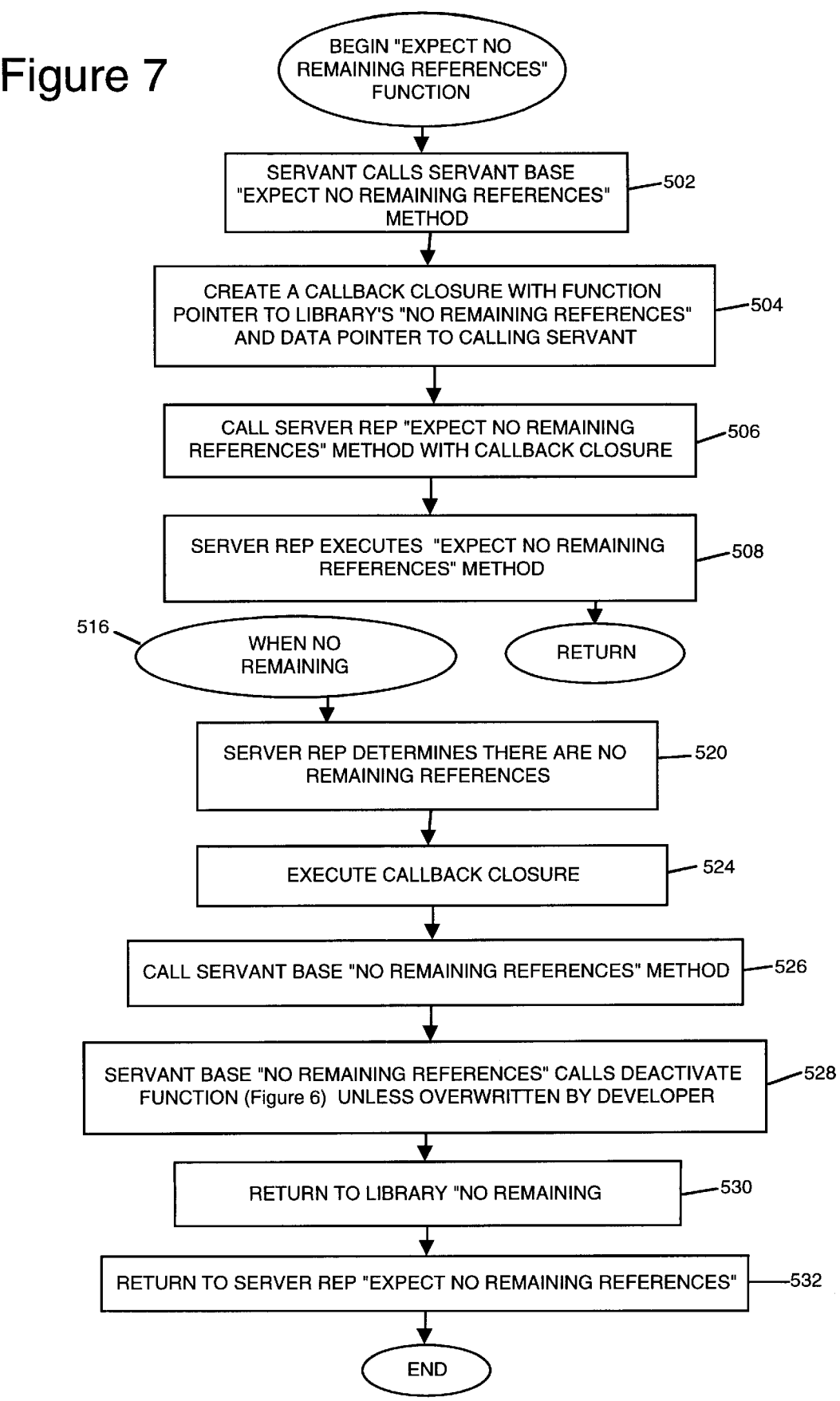
FIG. 7 is a flow chart for an "expect no remaining references" to a servant function in accordance with one embodiment of the present invention.

FIG. 7 illustrates an "expect no remaining references" function that may be used by a servant in order to determine if any references remain to itself according to one embodiment of the invention. If none exist, the servant may deactivate itself preferably by using the deactivate function as described in FIG. 6 above. Thus, the "expect no remaining references" function is useful for the servant in determining whether or not it may deactivate itself.

In a first step 502, the servant calls the "expect no remaining references" method defined upon the servant base class. This method is accessible to the servant because the servant base class is inherited by every servant class. Next, in step 504 this method creates a call back closure. A closure has two parts. The first part is a pointer to a function that will be executed at a later time, and the second part is a pointer to data that will be used by that function. In this case, the function pointer of the call back closure points to a "no remaining references" function in a system library, and the data pointer points to the calling servant. In step 506 the "expect no remaining references" method of the associated server rep is called with the call back closure as an argument. The servant has access to this method by way of the link 258 from the servant to the server rep object as shown in FIG. 4. In step 508 this "expect no remaining references" method of the server rep is executed and the call back closure is stored for later use. Next, the method returns to the servant base "expect no remaining references" method which also returns from whence it was called.

At this point, the function enter a wait state 516 until the server rep determines in step 520 that no other objects within the distributed object system hold references to the servant. If another object has a reference to this servant, the servant may not be deactivated, hence the wait state is necessary. Once the server rep determines that no remaining references exist, then step 524 executes the call back closure created above in step 504 by calling the function in the closure, in this case the library's "no remaining references" function with the servant as an argument. From within this function, the "no remaining references" method of the servant base is called in step 526. This technique allows the most derived version of the "no remaining references" method to be called, and allows developers a "hook" in order to overwrite the servant base "no remaining references" if desired. Assuming that "no remaining references" is not overwritten, then this method will call the deactivate function of FIG. 6 in order to deactivate the servant. Once step 528 has finished, control returns to the library "no remaining references" in step 530, and from there control returns to the server rep "expect no remaining references" method in step 532. After this step, the "expect no remaining references" function ends.

Figure 8:
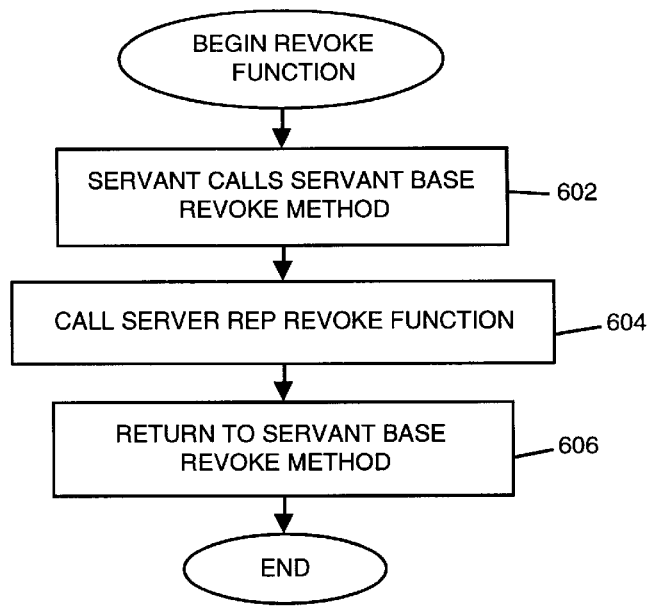
FIG. 8 is a flow chart for a "revoke servant" function in accordance with one embodiment of the present invention.

FIG. 8 illustrates the "revoke" function according to one embodiment that is used by a servant to revoke itself. The revoke method effectively prevents other objects from calling or referring to the servant. In a first step 602, the servant calls the "revoke" method defined upon the servant base class. This method is accessible to the servant because the servant base class is inherited by every servant class. Next, in step 604 this method calls the "revoke" method of the server rep. The servant has access to this method by way of the link 258 from the servant to the server rep as shown in FIG. 4. This revoke method will effectively revoke the servant. This revocation means that no further invocation or use of this object reference will be allowed. Once this method ends, it then returns to the servant base "revoke" method in step 606 and then the revoke function ends.

Figure 9:
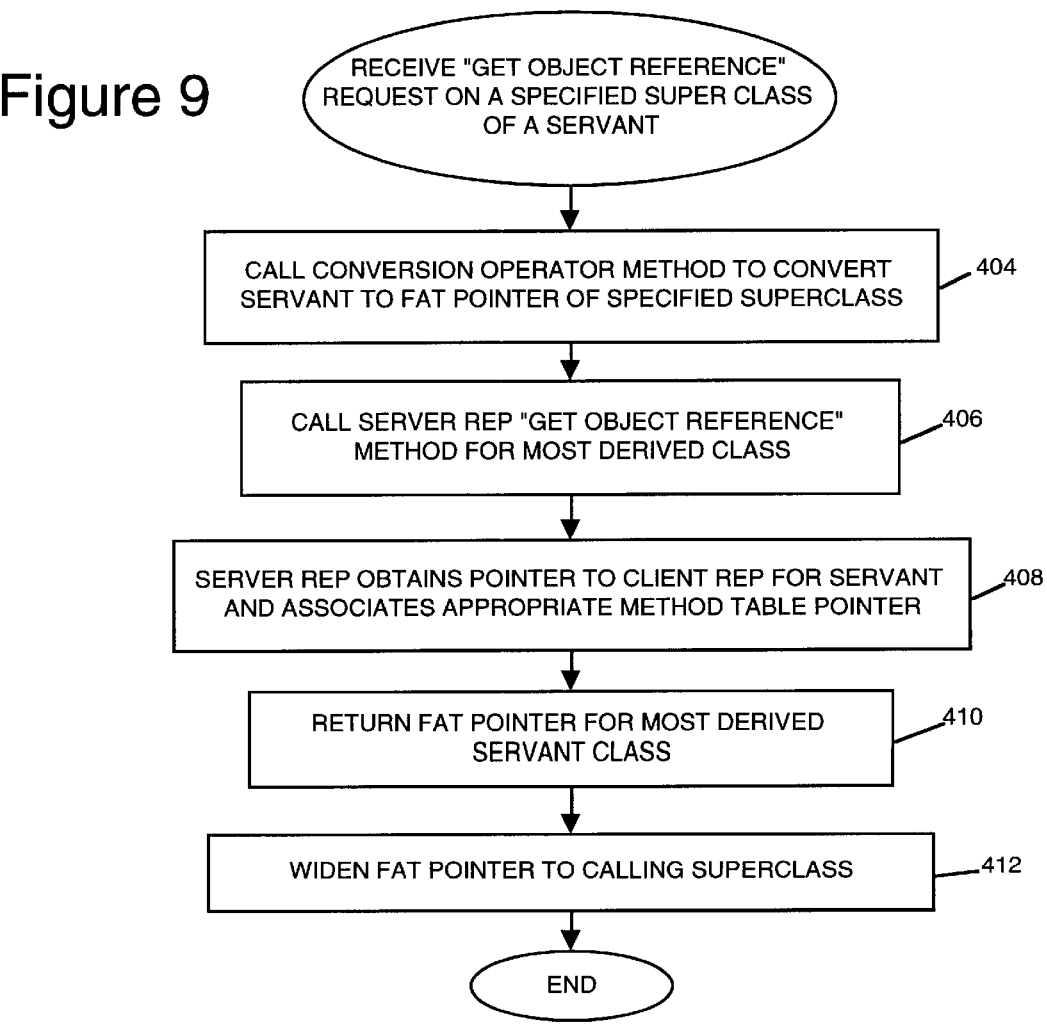
FIG. 9 is a "get object reference" for a servant function in accordance with one embodiment of the present invention.

FIG. 9 illustrates a function "get object reference" according to one embodiment that allows a servant to create an implementation-dependent pointer to itself for use by a client. That is, the "get object reference" function creates an object reference for the requesting servant. The function also allows the servant to return a pointer that has been widened to a specified super class of the servant. This implementation-dependent pointer that references a servant is a dual pointer which is referred to herein as a "fat pointer". It is termed a fat pointer because it actually contains two different pointers within its structure, i. e., it is larger or "fatter" than a single pointer. A fat pointer differs from the object reference of FIG. 1c in that while the object reference for a servant contains the implementation-independent information shown, a fat pointer for that servant is a language-dependent representation for use by the client in referencing the servant. By way of example, a fat pointer is a C++ object reference of a servant for use by a client. One of the pointers in a fat pointer points to a client rep that typically contains not only the object reference information of FIG. 1c, but also implementation-dependent information allowing the client to access the servant. As mentioned above, a fat pointer includes two pointers. The first is a pointer to a client representation (termed a "client rep"); the client rep is an object that contains not only the object reference information of FIG. 1c, but also client implementation-dependent information allowing invocation functions to access the servant. The second pointer of the fat pointer is a pointer to the method table associated with this servant. This will either be a local method table or a remote method table. It is contemplated that a fat pointer may include more than two pointers. A description of client reps and the use of method tables is described in the application Ser. No. 08/670,684, Attorney Docket No. SUN1P078, referenced above.

The function "get object reference" begins by receiving a request from a servant to create an object reference (a fat pointer) for a specified super class of that servant. This request may be handled by a method of the super class. By way of example, each super class has a method named "this" defined upon it which handles this request. Because the servant has specified which super class it wishes a fat pointer for, the function is able to determine the appropriate "this" method to call. In a first step 404, a conversion operator method defined upon the most derived servant base class is called. This conversion operator method is only defined upon the most derived servant base class, thus, the conversion operator allows access to the appropriate method tables. The conversion operator will convert the servant to a fat pointer having a type of the specified super class. In other words, the servant is used to create this fat pointer.

In step 406, the conversion operator method calls the "get object reference" method of the server rep linked to the servant with pointers to the local and remote method tables for the servant. These method tables are accessible because the servant itself knows the methods associated with it and has pointers to these methods. Next, in step 408 a fat pointer for the requesting servant is created. The server rep obtains (either by reusing one already created or by creating a new one) the client rep for the requesting servant and also associates a local or a remote method table with this fat pointer. Then, in step 410 the server rep "get object reference" method returns this newly created fat pointer to the conversion operator method called in step 404. At this point, the fat pointer is typed as for the most derived servant class. In step 412, the conversion operator method widens this fat pointer to a type associated with the specified super class. In other words, the type of the fat pointer is changed from that of the most derived class to the more general class of the specified super class. A derived class may also be termed a sub-class of a super class. That is, a super class is a more general type of a derived class. After step 412 the function ends.

Figure 11:
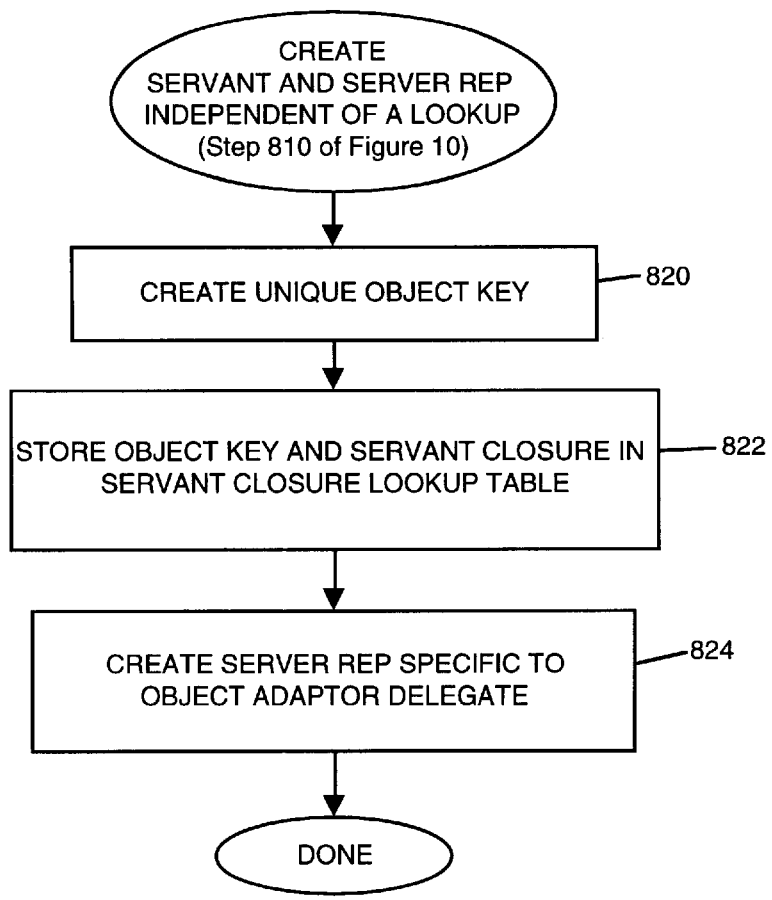
FIG. 11 is a flow chart for one embodiment of the "create server rep" step 810 of FIG. 10.

FIG. 10 illustrates a function that creates a servant and its corresponding server rep in one embodiment of the invention. The function may take place independently of a lookup from a client, or may occur in response to a lookup generated from a client request to access the servant. FIG. 11 handles the first situation and FIG. 12 handles the second. The servant and server rep creation function begins in step 801 by receiving the servant class name for which a servant is to be created, any arguments needed and an object adaptor delegate. The object adaptor delegate is an object that creates the server rep in step 810. It is termed the object adaptor delegate because it is delegated the duty of creating the server rep. The object adaptor delegate identifies a particular subcontract; thus, when creating the server rep, the object adaptor delegate is able to create a server rep associated with the particular subcontract. In this fashion, a server rep is created that may be linked to a servant and thus impart the functionality of this particular subcontract to the servant.

In step 802 storage is allocated for the servant. This step creates the actual space in memory that will be used by the servant and its associated variables, location indicators, etc. Next, in step 803 the constructor method for the most derived servant class name is called. This constructor method is used for assisting in the creation of servants, in general. In step 804, the constructor initializes any instance variables of the servant and makes sequential calls to higher base class constructors. Because each higher base class may have it own constructor method, these all are called in this step in order to facilitate the creation of the servant. At some point in these sequential calls, the constructor for the IDL generated skeleton class is reached. When the IDL generated skeleton class is reached, in step 806 it creates a servant closure with its function pointer indicating the dispatch method of the servant and its data pointer indicating the servant. The use of this servant closure and the dispatch method is described in the patent application Ser. No. 08/669,782, Attorney Docket No. SUN1P083 referenced above. The servant closure will be used when a call is made to the servant. The call will access the closure and execute the dispatch method upon the servant. In this manner, the servant closure provides the appropriate dispatch method in conjunction with the servant itself. The dispatch method performs the actual call to a method of the servant in response to an original client request.

Next, in step 808 this skeleton class constructor method calls the "initialize server rep" method defined upon the servant base with the arguments object adaptor delegate and the created servant closure. In step 810 this "initialize server rep" method calls the "create" method of the object adaptor delegate with the servant closure as an argument in order to produce a server rep. This step may be performed in different manners depending upon whether this create servant function is in response to a lookup request or not. Two such methods for performing this step are described below with reference to FIGS. 11 and 12. Once the server rep has been created in step 810, the object adaptor delegate "create" method returns the server rep. The returned server rep is then associated with the servant that has just been created in step 814. The server rep may be associated, or linked, to the servant in a wide variety of manners in order to allow the servant to access the subcontract functionality provided by the server rep. By way of example, the servant may contain a pointer variable that references the server rep. After the server rep and the servant have been linked in step 814, the "create servant" method ends and returns to the calling method.

FIG. 11 illustrates an embodiment of step 810 of FIG. 10 in which a servant and server rep are being created independent of a request from a client. By way of example, this situation may occur when a transient object is being created. In a first step 820 of this embodiment, a unique object key is created for the newly created servant. This key uniquely identifies the servant within the process where the servant exists. A unique key may be produced in a wide variety of manners. By way of example, the key may be time-based such that each servant has a unique key based upon what time it was created. The key may also be counter-based such that each successive servant is associated with an increasing counter. Alternatively, the key may also be associated with a unique address related to the servant's space in memory. Once the unique object key has been created, in step 822 the object key and the servant closure (which was previously created as described above with reference to FIG. 10) are stored in a servant closure lookup table. This lookup table allows future access to the servant by way of its object key. In other words, a future request that knows the object key may access this table in order to find the servant closure, and thus, the servant.

Then, in step 824, a server rep specific to the object adaptor delegate is created. In this embodiment, the object adaptor delegate received initially in step 801 is already associated with a particular subcontract. That is, when the create servant function is called, the calling entity passes in an object adaptor delegate corresponding to the type of subcontract that is desired for the server rep, and hence the servant. That is, if a servant with subcontract Y functionality is desired, the calling entity uses an object adaptor delegate corresponding to subcontract Y; thus, when this object adaptor delegate creates a server rep in step 824, the server rep will have subcontract Y functionality that it will then be able to impart to the newly created servant. These object adaptor delegates each representing a particular subcontract may be created at system startup time. Also, in this step 824 information is passed from the object adaptor delegate to the server rep to enable it to perform the above described functions of "deactivate", "expect no remaining references", "revoke" and "get object reference". Once step 824 has completed, this step of creating a server rep is done and control returns to step 812 of FIG. 10.

Figure 12:
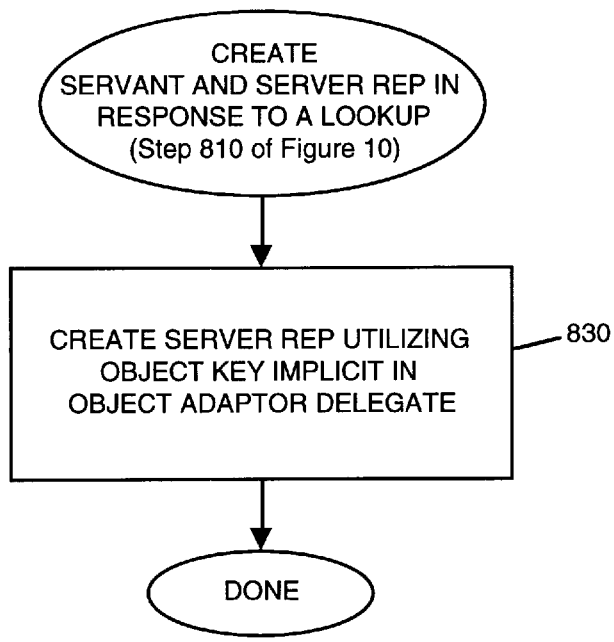
FIG. 12 is a flow chart for another embodiment of the "create server rep" step 810 of FIG. 10.

FIG. 12 illustrates another embodiment of the servant and server rep creating step 810 of FIG. 10. In this embodiment, the servant and server rep are being created in response to a request from a client that has generated a lookup. This situation may occur when a client invokes upon an object reference in order to execute a method of a servant. Therefore, in this situation an object reference will exist as it has been retrieved from the marshal buffer due to the client request to invoke upon this object reference. For this embodiment, an object adaptor delegate will be created on a per call basis, instead of being created at system startup as in FIG. 11. This created object adaptor delegate references the object key of the retrieved object reference. And because the object key contains a subcontract identifier (as shown in FIG. 1c), the object adaptor delegate may be associated with a particular subcontract. Thus, in step 830 the server rep is created corresponding to the subcontract implicit in the object adaptor delegate by way of referencing the object key. In other respects, this step is similar to step 824 of FIG. 11. Once step 830 has completed, control returns to step 812 of FIG. 10.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively reconfigured by a program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines appears from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include machine code produced by a compiler and files containing higher level code that may be executed using an interpreter.

Figure 13:
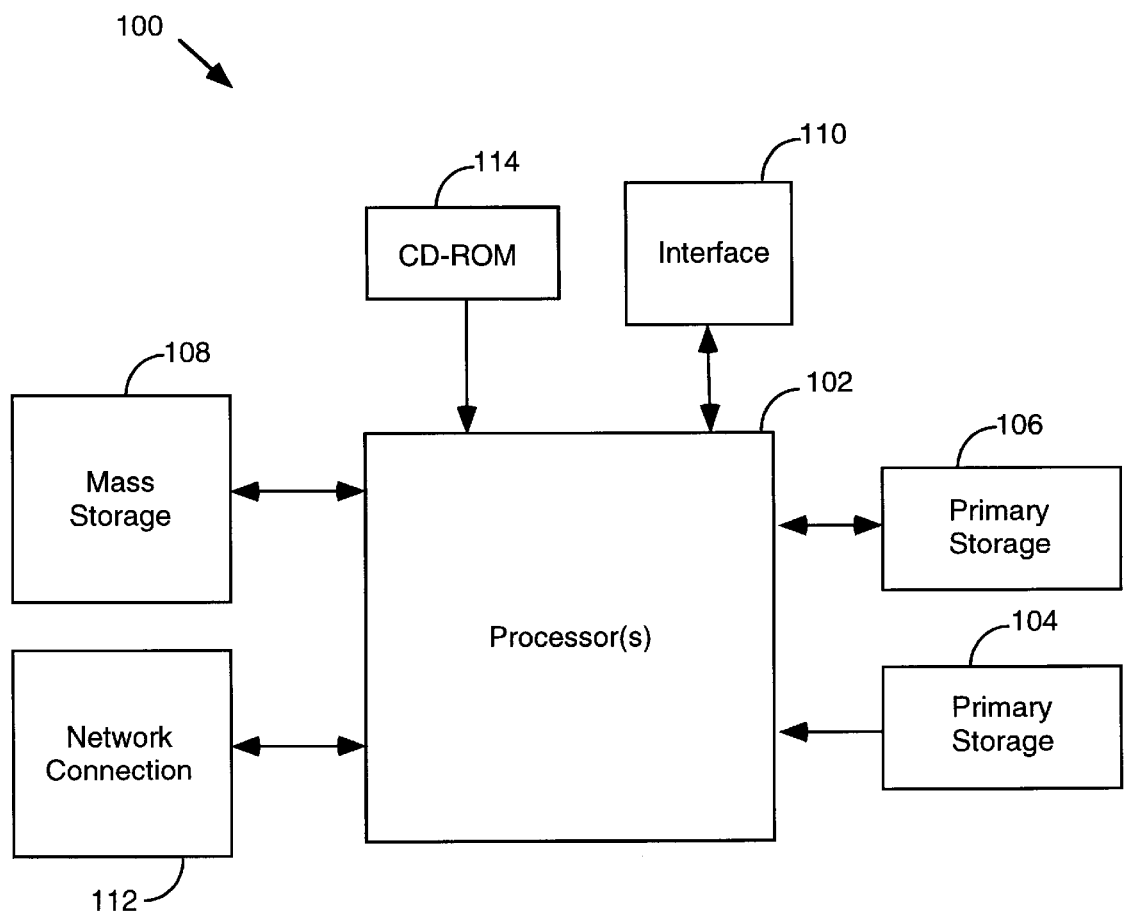
FIG. 13 shows a typical computer system suitable for implementing the present invention.

FIG. 13 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, although a specific implementation of a server rep is shown, it should be appreciated that any suitable implementation that allows a particular subcontract to be dynamically associated at run time with a servant may be used. Also, the link between the servant and server rep may be any suitable link that allows the servant to access the server rep and its functionality. And although only a few functions have been described, it should be appreciated that a servant would be able to access various functions that might be defined upon a server rep. Also, a servant may itself be able to call functions other than those described through the functionality of the server rep. Therefore, the described embodiments should be taken as illustrative and not restrictive, and the invention should not be limited to the details given herein but should be defined by the following claims and their full scope of equivalents.

We claim:

1. An association mechanism data structure for dynamically associating a service representation object with a servant object at run time in a distributed object computing system, said distributed object computing system incorporating a plurality of groups of object services, the association mechanism data structure being embodied in a computer-readable medium and comprising:

at least one service representation class representing a single one of the groups of object services, the service representation class arranged to provide functionality unique to said single one of the groups of object services via an instantiated service representation object at runtime;

at last one servant base class arranged to be associated with servant objects that are created at run time; and a linking mechanism arranged to form a run time link between the service representation object and a selected one of said servant objects at run time such that the servant object may use the functionality provided by said single one of the groups of object services by way of the service representation object.

2. An association mechanism data structure as recited in claim 1 wherein at run time the service representation object associated with the service representation class is created and the run time link includes a location indicator from the selected servant object to the service representation object.

3. An association mechanism data structure as recited in claim 1 wherein the service representation class includes a method suitable for deactivating a servant object, revoking a servant object, or determining whether there are currently references to a servant object.

4. An association mechanism data structure as recited in claim 3 wherein the service representation class further includes a method suitable for getting an object reference for a servant object.

5. A rum-time arrangement data structure embodied in a computer-readable medium for use in a distributed object computing system, said distributed object computing system incorporating a plurality of groups of object services, the run-time arrangement comprising:

a servant object that takes the form of an instance of a distributed object;

a service representation object representing a single one of the groups of object services, the service representation object being arranged to provide functionality unique to said single one of the groups of object services by way of a service representation class; and a link between the service representation object and the servant object that permits the servant object to access the functionalities provided by the service representation class by way of the service representation object.

6. An arrangement data structure as recited in claim 5 wherein the link includes a location indicator from the servant object to the service representation object.

7. An arrangement as recited in claim 5 wherein the service representation object provides access to methods suitable for deactivating the servant object, revoking the servant object, or determining whether there are currently references to the servant object, said methods thereby being accessible by the servant object.

8. An arrangement as recited in claim 7 wherein the service representation object further provides access to a method suitable for getting an object reference for the servant object that is accessible by the servant object.

9. A computer-implemented method of creating a distributed servant object for use in a distributed object computing system, the distributed object computing system providing groups of object services for use in managing distributed objects, the method comprising:

receiving a servant class name and an object adaptor delegate identifying a single one of the groups of object services;

instantiating a servant object corresponding to the received servant class name;

calling a create method of the object adaptor delegate in order to produce a service representation object arranged to provide functionality unique to said single one of the groups of object services identified by said object adaptor delegate; and associating the produced service representation object with the servant object such that the servant object may use the functionality provided by said single one of the groups of object services available through the service representation object.

10. A method as recited in claim 9 wherein the create method comprises:

creating an object key that uniquely identifies the servant object within a process;

storing the object key in a lookup table in association with a reference to the servant object; and creating the service representation object that corresponds to said single one of the groups of object services identified by the object adaptor delegate.

11. A method as recited in claim 9 wherein the object adaptor delegate identifies a single one of the groups of object services by reference to a received object key having a subcontract identifier and the create method comprises creating the service representation object corresponding to said single one of the groups of object services identified by the subcontract identifier.

12. A computer-implemented method of revoking a distributed servant object in a distributed object computing system, the distributed object computing system providing groups of object services for use in managing distributed objects, the method comprising:

calling a servant revoke method associated with the servant object, the servant revoke method being called by the servant object;

identifying a service representation object associated with the servant object, the service representation object being associated with said servant object via a link and being arranged to provide functionality unique to a single one of the groups of object services;

calling a service representation revoke method associated with the service representation object via said link; and revoking the servant object by way of the called service representation revoke method in a manner consistent with the single one of the groups of object services.

13. A computer-implemented method of creating an object reference of a servant object for use by a client in a distributed object computing system, the distributed object computing system providing groups of object services for use in managing distributed objects, the method comprising:

receiving a get object reference request for a specified super class of a servant object, the request originating from the servant object;

identifying a service representation object associated with the servant object, the service representation object being associated with said servant object via a link and being arranged to provide functionality unique to a single one of the groups of object services;

calling a get object reference method associated with the service representation object and implementing said get object reference method in a manner consistent with the single one of the groups of object services;

creating a fat pointer to the servant object, the fat pointer being created by the get object reference method; and widening the fat pointer in order to associate it with the specified super class.

14. A computer-implemented method of deactivating a distributed servant object in a distributed object computing system, the distributed object computing system providing groups of object services for use in managing distributed objects, the method comprising:

calling a servant deactivate method associated with the servant object, the servant deactivate method being called by the servant object;

identifying a service representation object associated with the servant object, the service representation object being associated with said servant object via a link and being arranged to provide functionality unique to a single one of the groups of object services;

calling a service representation deactivate method associated with the service representation object; and deactivating the servant object by way of the called service representation deactivate method in a manner consistent with the single one of the groups of object services.

15. A computer-implemented method of deactivating a distributed servant object as recited in claim 14 further comprising:

creating a call back closure for the servant object;

passing the call back closure to the service representation object together with the call to the service representation deactivate method;

determining whether the servant object may be deactivated; and when it is determined that the servant object may be deactivated, executing the call back closure.

16. A computer implemented method of deactivating a distributed servant object as recited in claim 15 further comprising calling a servant deactivate done method associated with the servant object in order to deactivate the servant object.

17. A computer apparatus comprising:

a processing unit;

an input/output device coupled to said processing unit; and a storage device in communication with said processing unit, the storage device including an association mechanism data structure for dynamically associating a service representation with a servant object at run time in a distributed object computing system, said distributed object computing system incorporating a plurality of groups of object services, the association mechanism data structure being embodied in a computer-readable medium and comprising at least one service representation class representing a single one of the groups of object services, the service representation class arranged to provide functionality unique to said single one of the groups of object services via an instantiated service representation object at runtime, at least one servant base class arranged to be associated with servant objects that are created at run time, and a linking mechanism arranged to form a run time link between the service representation class and a selected one of said servant objects at run time such that the servant object may use the functionality provided by said single one of the groups of object services by way of the service representation object.

18. A computer program product comprising a computer-usable medium having computer-readable program code embodied thereon for creating a distributed servant object for use in a distributed object computing system, the distributed object computing system providing groups of object services for use in managing distributed objects, said computer program product comprising computer-readable program code for effecting the following within a computer system:

receiving a servant class name and an object adaptor delegate identifying a single one of the groups of object services;

instantiating a servant object corresponding to the received servant class name;

calling a create method of the object adaptor delegate in order to produce a service representation object arranged to provide functionality unique to said single one of the groups of object services identified by said object adaptor delegate; and associating the produced service representation object with the servant object such that the servant object may use the functionality provided by said single one of the groups of object services available through the service representation object.

19. A computer program product as recited in claim 18 wherein the create method comprises:

creating an object key that uniquely identifies the servant object within a process;

storing the object key in a lookup table in association with a reference to the servant object; and creating the service representation object that corresponds to said single one of the groups of object services identified by the object adaptor delegate.

20. A computer program product as recited in claim 18 wherein the object adaptor delegate identifies a single one of the groups of object services by reference to a received object key having a subcontract identifier and the create method comprises creating the service representation object corresponding to said single one of the groups of object services identified by the subcontract identifier.

21. A computer program product comprising a computer-usable medium having computer-readable program code embodied thereon for revoking a distributed servant object in a distributed object computing system, the distributed object computing system providing groups of object services for use in managing distributed objects, said computer program product comprising computer-readable program code for effecting the following within a computer system:

calling a servant revoke method associated with the servant object, the servant revoke method being called by the servant object;

identifying a service representation object associated with the servant object, the service representation object being associated with said servant object via a link and being arranged to provide functionality unique to a single one of the groups of object services;

calling a service representation revoke method associated with the service representation object via said link; and revoking the servant object by way of the called service representation revoke method in a manner consistent with the single one of the groups of object services.

22. A computer program product comprising a computer-usable medium having computer-readable program code embodied thereon for creating an object reference of a servant object for use by a client in a distributed object computing system, the distributed object computing system providing groups of object services for use in managing distributed objects, said computer program product comprising computer-readable program code for effecting the following within a computer system:

receiving a get object reference request for a specified super class of a servant object, the request originating from the servant object;

identifying a service representation object associated with the servant object, the service representation object being associated with said servant object via a link and being arranged to provide functionality unique to a single one of the groups of object services;

calling a get object reference method associated with the service representation object and implementing said get object reference method in a manner consistent with the single one of the groups of object services;

creating a fat pointer to the servant object, the fat pointer being created by the get object reference method; and widening the fat pointer in order to associate it with the specified super class.

23. A computer program product comprising a computer-usable medium having computer-readable program code embodied thereon for deactivating a distributed servant object in a distributed object computing system, the distributed object computing system providing groups of object services for use in managing distributed objects, said computer program product comprising computer-readable program code for effecting the following within a computer system:

calling a servant deactivate method associated with the servant object, the servant deactivate method being called by the servant object;

identifying a service representation object associated with the servant object, the service representation object being associated with said servant object via a link and being arranged to provide functionality unique to a single one of the groups of object services;

calling a service representation deactivate method associated with the service representation object; and deactivating the servant object by way of the called service representation deactivate method in a manner consistent with the single one of the groups of object services.

24. A computer program product for deactivating a distributed servant object as recited in claim 23 further comprising program code for effecting:

creating a call back closure for the servant object;

passing the call back closure to the service representation object together with the call to the service representation deactivate method;

determining whether the servant object may be deactivated; and when it is determined that the servant object may be deactivated, executing the call back closure.

25. A computer program product for deactivating a distributed servant object as recited in claim 24 further comprising program code for effecting calling a servant deactivate done method associated with the servant object in order to deactivate the servant object.

* * * * *